United States Patent
Derx et al.

(10) Patent No.: US 10,399,413 B2
(45) Date of Patent: Sep. 3, 2019

(54) VEHICLE HEATING, VENTILATING AND/OR AIR CONDITIONING DEVICE

(71) Applicant: Valeo Klimasysteme GmbH, Bad Rodach (DE)

(72) Inventors: Siegfried Derx, Lichtenfels (DE); Alexander Karl, Bad Rodach (DE)

(73) Assignee: Valeo Klimasysteme GmbH, Bad Rodach (DE)

( * ) Notice: Subject to any disclaimer, the term of this patent is extended or adjusted under 35 U.S.C. 154(b) by 574 days.

(21) Appl. No.: 14/410,603

(22) PCT Filed: Jun. 24, 2013

(86) PCT No.: PCT/EP2013/063093
§ 371 (c)(1),
(2) Date: Dec. 23, 2014

(87) PCT Pub. No.: WO2014/001231
PCT Pub. Date: Jan. 3, 2014

(65) Prior Publication Data
US 2015/0191074 A1    Jul. 9, 2015

(30) Foreign Application Priority Data

Jun. 25, 2012 (DE) .................. 10 2012 012 654

(51) Int. Cl.
*B60H 1/22* (2006.01)
*B60H 1/24* (2006.01)
*B60H 1/00* (2006.01)

(52) U.S. Cl.
CPC ....... *B60H 1/2221* (2013.01); *B60H 1/00064* (2013.01); *B60H 1/241* (2013.01);
(Continued)

(58) Field of Classification Search
CPC . B60H 1/00564; F15D 1/0015; F15D 1/0045; F15D 1/009
See application file for complete search history.

(56) References Cited

U.S. PATENT DOCUMENTS 5,938,525 A * 8/1999 Birdsong .............. F24F 13/065
454/290
6,092,592 A * 7/2000 Toyoshima .......... B60H 1/0005
165/204

(Continued)

FOREIGN PATENT DOCUMENTS

| DE | 199 43 762 A1 | 3/2001 |
| EP | 1 621 378 A1 | 2/2006 |
| EP | 1 780 061 A1 | 5/2007 |

OTHER PUBLICATIONS

International Search Report for Application No. PCT/EP2013/063093 dated Oct. 1, 2013, 4 pages.

(Continued)

*Primary Examiner* — Gregory L Huson
*Assistant Examiner* — Elizabeth M. May
(74) *Attorney, Agent, or Firm* — Howard & Howard Attorneys PLLC

(57) ABSTRACT

A vehicle heating, ventilating and/or air conditioning device (10) comprising a housing (12), in which at least two hot-air guiding ducts (18, 19) are formed for different vehicle interior regions, the hot-air guiding ducts (18, 19) being separated by a housing wall (28). A common heating device (30) and a common air treatment element (32) are provided which are arranged in each case in both hot-air guiding ducts (18, 19), the air treatment element (32) being arranged in the air flow downstream of the heating device (30). The air treatment element (32) has a dividing wall (34) which (Continued)

Figure 1:
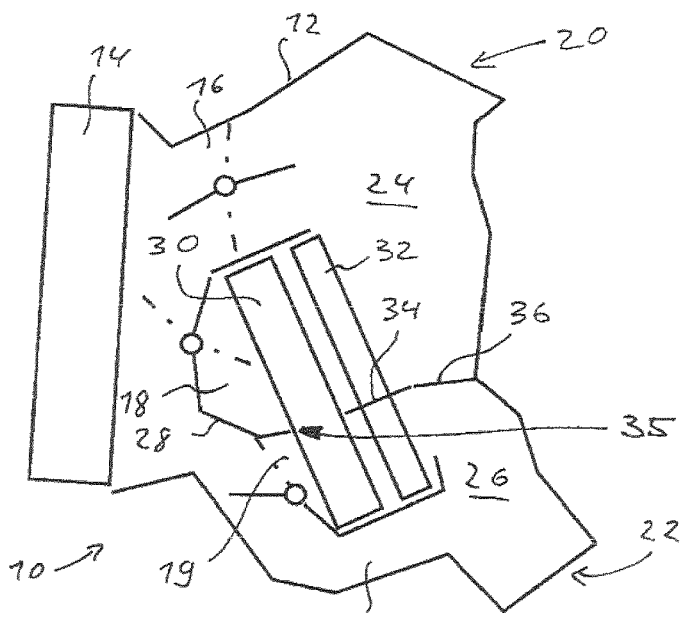

divides the air treatment element (32) into at least two part regions which are assigned to in each case one hot-air guiding duct (18, 19).

14 Claims, 2 Drawing Sheets

(52) U.S. Cl.
CPC .............. *B60H 2001/00128* (2013.01); *B60H 2001/00185* (2013.01); *B60H 2001/2287* (2013.01)

(56) References Cited

U.S. PATENT DOCUMENTS

| | | | | |
|---|---|---|---|---|
| 6,247,530 | B1* | 6/2001 | Mochizuki | B60H 1/00064 165/203 |
| 6,308,770 | B1* | 10/2001 | Shikata | B60H 1/00064 165/126 |
| 2005/0242082 | A1 | 11/2005 | Hamburger et al. | |
| 2007/0271953 | A1 | 11/2007 | Koukouravas et al. | |

OTHER PUBLICATIONS

English language abstract and machine-assisted English translation for DE 199 43 762 extracted from espacenet.com database on Dec. 30, 2014, 20 pages.

English language abstract and machine-assisted English translation for EP 1 621 378 extracted from espacenet.com database on Dec. 30, 2014, 12 pages.

English language abstract and machine-assisted English translation for EP 1 780 061 extracted from espacenet.com database on Dec. 30, 2014, 31 pages.

* cited by examiner

VEHICLE HEATING, VENTILATING AND/OR AIR CONDITIONING DEVICE

RELATED APPLICATIONS

This application is the National Stage of International Patent Application No. PCT/EP2013/063093, filed on Jun. 24, 2013, which claims priority to and all the advantages of German Patent Application No. DE 10 2012 012 654.9, filed on Jun. 25, 2012, the content of which is incorporated herein by reference.

The invention relates to a vehicle heating, ventilating and/or air conditioning device having a housing, in which at least two hot-air guiding ducts are formed for different vehicle interior regions, the hot-air guiding ducts being separated by a housing wall.

Vehicle air conditioning devices of this type are known from the prior art, in order for it to be possible to ventilate different vehicle interior regions with air of different warmth.

It is an object of the invention to provide a vehicle heating, ventilating and/or air conditioning device which has a simple and compact construction and makes satisfactory control of the respective air temperature for the different vehicle interior regions possible.

The object of the invention is achieved by a vehicle heating, ventilating and/or air conditioning device according to the invention having the features of claim 1. The vehicle heating, ventilating and/or air conditioning device comprises a housing, in which at least two hot-air guiding ducts are formed for different vehicle interior regions, the hot-air guiding ducts being separated by a housing wall. A common heating device and a common air treatment element are provided which are arranged in each case in both hot-air guiding ducts, the air treatment element being arranged in the air flow downstream of the heating device. The air treatment element has a dividing wall which divides the air treatment element into at least two part regions which are assigned to in each case one hot-air guiding duct. In this way, a simple and compact construction is made possible, since one heating device and one air treatment element are provided for both hot-air guiding ducts. This also makes simple assembly, maintenance and repair possible. As a result of the different part regions of the air treatment element, the air flows which flow through the different hot-air guiding ducts can be treated independently of one another. A cross-flow of air between the two part regions and therefore between the two hot-air guiding ducts is prevented by the dividing wall, as a result of which satisfactory control of the air temperature for the respective vehicle interior regions is made possible.

The dividing wall preferably adjoins the heating device upstream. In this way, a cross-flow of air between the hot-air guiding ducts downstream of the heating device is prevented.

In order to prevent a cross-flow of air between the two hot-air guiding ducts in the region of the common heating device, the dividing wall advantageously lies opposite the housing wall which is arranged upstream of the heating device and separates the hot-air guiding ducts.

The dividing wall and housing wall are preferably oriented so as to be aligned with one another.

A cross-flow of air downstream of the air treatment element can be prevented by the dividing wall, in particular, adjoining an air guiding element downstream, which air guiding element lies, for example, between the hot-air guiding ducts and therefore separates them from one another.

The air guiding element can be a rigid housing wall.

As an alternative, it is possible that the air guiding element is a movable flap which assigns the air which flows through a part region of the air treatment element optionally to one of the hot-air guiding ducts. In this way, it is possible to assign the entire air which flows through the common heating device and the common air treatment element to one hot-air guiding duct, as a result of which one vehicle interior region can be heated and ventilated with full heating power.

In order to make individual additional heating of the air in at least one hot-air guiding duct possible, the air treatment element can have at least one part region, in which at least one electric heating element is provided. For example, the electric heating element is a PTC heating resistor.

It is also possible that the air treatment element has at least one part region, in which at least one homogenization element is provided for air temperature equalization.

The homogenization element can be configured in such a way that the flow resistance is substantially equal in all part regions of the air treatment element. In this way, pressure differences in the hot-air guiding ducts can be reduced.

For example, the homogenization element is a swirl grille. In this way, firstly a defined flow resistance is produced and secondly the air is swirled when flowing through the homogenization element, as a result of which improved temperature equalization of the air is made possible and the result is a homogeneous air temperature downstream of the homogenization element.

A simple construction and simple repair and maintenance of the vehicle heating, ventilating and/or air conditioning device are made possible by the vehicle heating, ventilating and/or air conditioning device being of modular configuration and the air treatment element being an exchangeable module. Here, it is also possible to exchange differently configured air treatment elements in a modular manner, it being possible, for example, for air treatment elements to be provided with heating elements and without heating elements and thus for a different functionality to be achieved.

A compact and stable construction is made possible by the air treatment element having a frame, the dividing wall forming a stabilizing wall of the frame.

For example, the vehicle heating, ventilating and air conditioning device can be configured for three or more air conditioning zones, one hot-air guiding duct being assigned to a front vehicle zone and another hot-air guiding duct being assigned to a rear vehicle zone.

Figure 2:
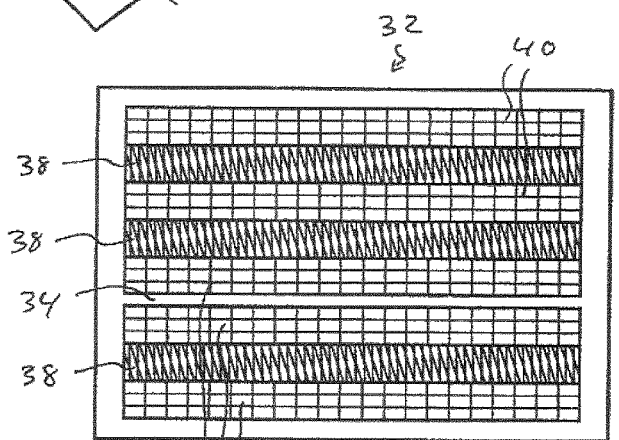
Figure 3:
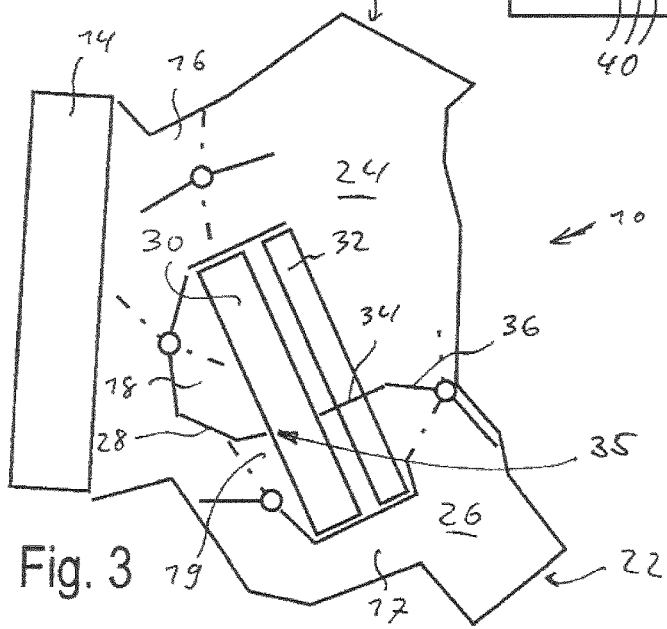
Figure 4:
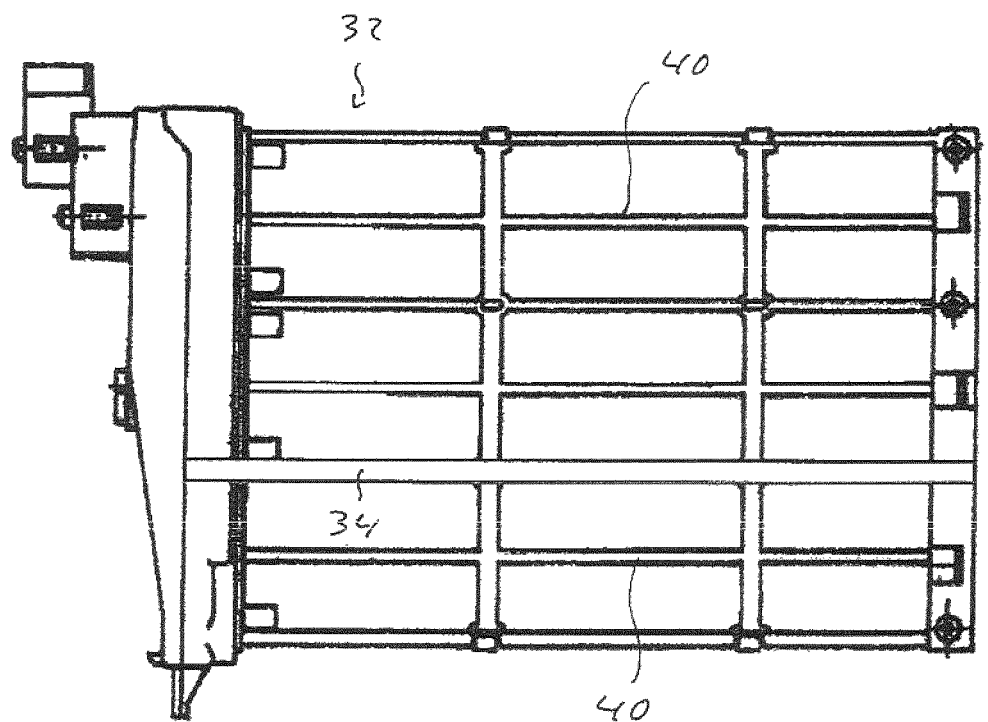
Figure 5:
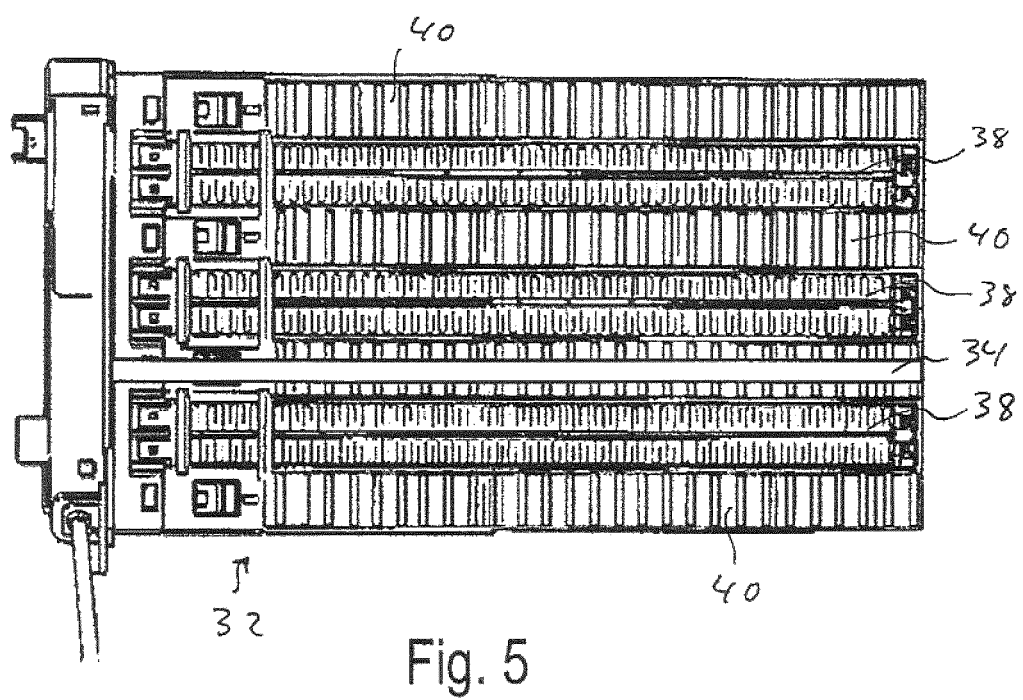

Further features and advantages result from the following description and from the drawings, to which reference is made and in which:

FIG. 1 shows a diagrammatic sectional view of a vehicle heating, ventilating and/or air conditioning device according to the invention in accordance with a first embodiment, FIG. 2 shows a diagrammatic plan view of an air treatment element of the vehicle heating, ventilating and/or air conditioning device according to FIG. 1, FIG. 3 shows a diagrammatic view of a vehicle heating, ventilating and/or air conditioning device in accordance with a second embodiment of the invention, FIG. 4 shows a modular air treatment element of a vehicle heating, ventilating and/or air conditioning device according to the invention, which modular air treatment element is configured as a homogenization element, and FIG. 5 shows a modular air treatment element for a vehicle heating, ventilating and/or air conditioning device according to the invention with electric heating elements.

FIG. 1 shows a vehicle heating, ventilating and air conditioning device (HVAC device) which will be called a vehicle air conditioning device 10 for short in the following text. It is also possible that merely a heating and ventilating function is provided.

The vehicle air conditioning device 10 comprises a housing 12, in which air guiding ducts and flaps for controlling the air flows through the air guiding ducts are provided.

A fan (not shown) sucks in air which flows through an air filter and a cooling device 14, in which the air is cooled and dried. The dried cooled air flows subsequently into a plurality of air guiding ducts, in each case two cold-air guiding ducts 16, 17 and two hot-air guiding ducts 18, 19 being provided in the embodiment which is shown.

The vehicle air conditioning device 10 is configured for at least two air conditioning zones, each air conditioning zone corresponding to a vehicle interior region which can be ventilated with an air temperature which can be controlled or regulated individually. Two air conditioning zones are provided in the embodiment which is shown, it being possible for the first air conditioning zone to be ventilated via a first air outlet 20 in the housing 12 of the vehicle air conditioning device 10 and for the second air conditioning zone to be ventilated via a second air outlet 22. In the embodiment which is shown, the vehicle interior regions are a front space and a rear space of the vehicle interior.

A third air conditioning zone can be provided and is provided, for example, for ventilating the windshield. Furthermore, a division of left-hand and right-hand vehicle side and corresponding further air conditioning zones is possible.

A first cold-air guiding duct 16 and a first hot-air guiding duct 18 lead from the cooling device 14 to a first air mixing space 24 in the housing 12.

A second cold-air guiding duct 17 and a second hot-air guiding duct 19 are provided which lead from the cooling device 14 to a second air mixing space 26.

The first and second hot-air guiding ducts 18, 19 are arranged so as to adjoin one another and are separated from one another by a housing wall 28. The hot-air guiding ducts 18, 19 which are arranged adjacently have a common heating device 30, through which the two air flows flow.

Upstream of the heating device 30, the hot-air guiding ducts 18, 19 are separated by the housing wall 28.

A common air treatment element 32 is provided downstream of the heating device 30. The air treatment element 32 has a dividing wall 34 which divides the air treatment element 32 into two part regions. The two part regions are assigned in each case to a hot-air guiding duct 18.

The dividing wall 34 adjoins the heating device 30 upstream (preferably making contact) and lies opposite the housing wall 28 which is arranged upstream of the heating device 30, more precisely that end 35 of the housing wall 28 which in turn adjoins the heating device 30.

An air guiding element 36 adjoins the dividing wall 34 of the air treatment element 32 downstream, in particular making contact.

In the embodiment which is shown in FIG. 1, the air guiding element 36 is a rigid housing wall of the housing 12.

The dividing wall 34 prevents a cross-flow of hot air between the first and second hot-air guiding ducts 18, 19 in the region of the air treatment element 32.

In the embodiment which is shown, the heating device 30 is configured as a capacitor and comprises heat transfer fins which are arranged in such a way that a cross-flow of air between ducts which are formed by the heat transfer fins and are assigned to the first or second hot-air guiding duct 18 is not possible.

In order to reach a desired temperature of the air for the first air conditioning zone, in each case the air flow through the first cold-air guiding duct 16 and the first hot-air guiding duct 18 is controlled by the respective flaps. In the air mixing space 24, the cold air and the hot air are mixed and flow as mixed air through the first air outlet 20.

A common flap which controls the air volume proportion between hot air and cold air is provided in the second cold-air guiding duct 17 and hot-air guiding duct 19. After running through the cold-air guiding duct 17 and the hot-air guiding duct 19, the hot air and cold air are mixed in the second air mixing space 26 and flow through the second air outlet 22 into the second vehicle interior region.

The vehicle air conditioning device 10 is of modular configuration, the air treatment element 32, in particular, being an exchangeable module. The air treatment element 32 can therefore be exchanged in a simple way, for example if a repair is necessary or another functionality of the vehicle air conditioning device 10 is desired which is made possible by an air treatment element 32 of alternative configuration.

FIG. 2 shows a diagrammatic view of the air treatment element 32 in a plan view in the direction of flow. The dividing wall 34 extends over the entire width of the air treatment element 32.

The dividing wall 34 forms a stabilizing wall of a frame of the air treatment element. In the embodiment which is shown, the air treatment element 32 comprises electric heating elements 38 and/or homogenization elements 40.

The electric heating elements 38 are configured, for example, as PTC heating resistors and make individually controlled heating of the air which flows through the part region possible. In this way, the heating output of the vehicle air conditioning device 10 can be adapted individually for the different air conditioning zones. In particular, an individual controlled heating output for the different air conditioning zones is also possible if the vehicle air conditioning device is operated in the pure heating air mode, that is to say, the flaps of the vehicle air conditioning device 10 in the housing 12 close in each case the cold-air guiding ducts 16, 17 completely, and air flows exclusively through the two hot-air guiding ducts 18, 19.

It is also possible to provide further vehicle air conditioning zones and to control their air temperature by way of an air treatment element 32, an additional dividing wall, for example, being provided vertically with respect to the dividing wall 34, which additional dividing wall divides the first or second part region in turn into two part regions. In this way, for example, left-hand and right-hand vehicle halves can be ventilated with air of different warmth.

The homogenization elements 40 are provided for air temperature equalization. In the embodiment which is shown, the homogenization elements 40 are configured as swirl grilles, the air which flows through being swirled by the homogenization element 40, as a result of which the air is mixed in an improved manner and a homogeneous temperature is therefore set. Furthermore, the air flow resistance is increased in the corresponding part region by the homogenization elements 40. In the embodiment which is shown, the air treatment element 32 is configured here in such a way that the flow resistance is substantially equal in all part regions of the air treatment element 32. In this way, no local pressure differences between the different regions of the vehicle air conditioning device 10 are produced by the air treatment element 32.

FIG. 3 shows an alternative embodiment of the vehicle air conditioning device 10 which differs from the previous embodiment in that the air guiding element 36 which adjoins the dividing wall 34 of the air treatment element 32 downstream is formed, instead of by a rigid housing wall, by a movable flap which assigns the air which flows through a part region of the air treatment element 32 optionally to one of the hot-air guiding ducts 18, 19. It is possible in this way, with a corresponding flap position, to assign air which flows through that part region of the air treatment element 32 which is assigned to the second hot-air guiding duct 19 to the first hot-air guiding duct 18 and therefore to guide it to the first air mixing space 24. In this way, for example, all the hot air can be fed to the front vehicle interior region.

FIGS. 4 and 5 in each case show an air treatment element 32 in a modular configuration. FIG. 4 shows the air treatment element 32, in each case one homogenization element 40 in the form of a swirl grille being provided in both part regions.

FIG. 5 shows an alternative embodiment of the air treatment element 32 which is configured analogously to the air treatment element 32 which is shown in FIG. 2. In the embodiment which is shown, three electric heating elements 38 are provided which can be operated independently of one another.

In the embodiment according to FIG. 5, two are assigned to the first part region of the air treatment element 32 and one is assigned to the second part region of the air treatment element 32. The electric heating elements 38 are provided only in sections of the flow cross section of the respective part regions. In the other flow cross-sectional regions, in each case homogenization elements 40 are provided in the form of swirl grilles which match the flow resistance and ensure satisfactory thorough mixing of air and temperature equalization.

It is also possible that, for example, only one of the part regions has an electric heating element 38 and merely one homogenization element 40 is provided in the other part region.

The invention claimed is:

1. A vehicle heating, ventilating and/or air conditioning device (10) having
a housing (12), in which at least two hot-air guiding ducts (18, 19) are formed for different vehicle interior regions, the hot-air guiding ducts (18, 19) being separated by a housing wall (28),
a first cold-air guiding duct (16) and the first hot-air guiding duct (18) leading from a cooling device (14) to a first air mixing space (24) in the housing,
a second cold-air guiding duct (17) and the second hot-air guiding duct (19) leading from the cooling device (14) to a second air mixing space (26) in the housing,
a common flap provided in the second cold-air guiding duct (17) and the second hot-air guiding duct (19) controlling air volume proportion between hot air and cold air,
wherein air flow through the first cold-air guiding duct (16) and the first hot-air guiding duct (18) is controlled by two respective flaps, and
a common heating device (30) and a common air treatment element (32) which are arranged in each case in both hot-air guiding ducts (18, 19), the air treatment element (32) being arranged in the air flow downstream of the heating device (30),
wherein the air treatment element (32) has a dividing wall (34) which divides the air treatment element (32) into at least two part regions which are assigned to in each case one hot-air guiding duct (18, 19), wherein the dividing wall (34) adjoins an air guiding element (36), wherein the air guiding element (36) has a length that extends to the end of the housing (12), wherein the air guiding element (36) is a movable flap which assigns the air which flows through at least one part region of the air treatment element (32) to one of the hot-air guiding ducts (18, 19), thereby, with a corresponding flap position, assigning air which flows through the at least one part region which is assigned to the second hot-air guiding duct (19) toward the direction of air which is assigned to the first hot-air guiding duct (18), and
wherein a plurality of electric heating elements (38) are provided in the at least two part regions and wherein a number of electric heating elements (38) in the at least one part region on one side of the dividing wall (34) is different than a number of electric heating elements (38) in the at least second part region on an opposing side of the dividing wall (34).

2. A vehicle heating, ventilating and/or air conditioning device (10) according to claim 1, wherein the dividing wall (34) is disposed opposite the housing wall (28) which is arranged upstream of the heating device (30).

3. A vehicle heating, ventilating and/or air conditioning device (10) according to claim 1, wherein the air guiding element (36) is arranged downstream of the dividing wall (34).

4. A vehicle heating, ventilating and/or air conditioning device (10) according to claim 1, wherein the air guiding element (36) is disposed between the hot-air guiding ducts (18, 19).

5. A vehicle heating, ventilating and/or air conditioning device (10) according to claim 1, which is of modular configuration and the air treatment element (32) is an exchangeable module.

6. A vehicle heating, ventilating and/or air conditioning device (10) according to claim 1, wherein the air treatment element (32) has a frame, and the dividing wall (34) forms a stabilizing wall of the frame.

7. A vehicle heating, ventilating and/or air conditioning device (10) according to claim 1, which is configured for three or more air conditioning zones, one hot-air guiding duct (18) being assigned to a front vehicle zone and another hot-air guiding duct (19) being assigned to a rear vehicle zone.

8. A vehicle heating, ventilating and/or air conditioning device (10) according to claim 1, wherein the first hot-air guiding duct (18) leads to a first air mixing space (24) in the housing and wherein air is assigned to the first air mixing space (24).

9. A vehicle heating, ventilating and/or air conditioning device (10) according to claim 1, wherein the number of electric heating elements (38) in the at least one part region on one side of the dividing wall (34) is two and the number of electric heating elements (38) in the at least second part region on an opposing side of the dividing wall (34) is one.

10. A vehicle heating, ventilating and/or air conditioning device (10) according to claim 1, wherein the dividing wall (34) adjoins the heating device (30) upstream.

11. A vehicle heating, ventilating and/or air conditioning device (10) according to claim 10, wherein the dividing wall (34) is disposed opposite the housing wall (28) which is arranged upstream of the heating device (30).

12. A vehicle heating, ventilating and/or air conditioning device (10) according to claim 1, wherein the air treatment element (32) has at least one part region, in which at least one homogenization element (40) is provided for air temperature equalization.

13. A vehicle heating, ventilating and/or air conditioning device (10) according to claim 12, wherein the homogenization element (40) is configured in such a way that the flow resistance is substantially equal in all part regions of the air treatment element (32).

14. A vehicle heating, ventilating and/or air conditioning device (10) according to claim 12, wherein the homogenization element (40) is a swirl grille.

* * * * *